United States Patent
Praxmarer et al.

(10) Patent No.: US 6,467,292 B1
(45) Date of Patent: Oct. 22, 2002

(54) CONTROL SYSTEM FOR COMPRESSED GAS REFRIGERATION DRYERS

(75) Inventors: Peter Paul Praxmarer, Padua (IT); Luciano Bellemo, Venice (IT)

(73) Assignee: Domnick Hunter Hoross S.p.A., Sant'Angelo Di Piove (IT)

(*) Notice: Subject to any disclaimer, the term of this patent is extended or adjusted under 35 U.S.C. 154(b) by 0 days.

(21) Appl. No.: 09/975,803

(22) Filed: Oct. 12, 2001

(30) Foreign Application Priority Data

Sep. 14, 2001 (IT) ..................... MI2001A1918

(51) Int. Cl.[7] ............... F25D 17/06; F25B 1/00; F25B 49/00
(52) U.S. Cl. .............. 62/228.4; 62/93; 62/228.3
(58) Field of Search ............ 62/93, 228.3, 228.4

(56) References Cited

U.S. PATENT DOCUMENTS

| | | | | |
|---|---|---|---|---|
| 5,193,353 A | * | 3/1993 | Brendel et al. | 62/196.4 |
| 5,253,483 A | * | 10/1993 | Powell et al. | 62/181 |
| 5,255,529 A | * | 10/1993 | Powell et al. | 62/180 |
| 5,257,508 A | * | 11/1993 | Powell et al. | 62/180 |
| 5,271,238 A | * | 12/1993 | Powell et al. | 62/196.2 |
| 5,396,779 A | * | 3/1995 | Voss | 62/196.2 |
| 5,916,252 A | * | 6/1999 | Yoshida et al. | 62/204 |
| 6,393,850 B1 | * | 5/2002 | Vanderstraeten | 62/196.3 |

* cited by examiner

Primary Examiner—William Doerrler
Assistant Examiner—Filip Zec
(74) Attorney, Agent, or Firm—Hedman & Costigan, P.C.

(57) ABSTRACT

A control system for compressed gas refrigeration dryers comprises a gas/gas exchanger (7), suitable for cooling a mixture of compressed gas (M), using an outgoing gas (K) from an air condenser (8), and at least one refrigeration cycle (11), which includes an evaporator (6); each of said refrigeration cycles (11) comprises at least two compressors (1, 2), connected in parallel to each other and each connected in series to at least one non-return valve (3), said compressors (1, 2) being further connected, by means of at least one duct (13), so that the respective zones containing the lubricating oil are connected to each other. It also comprises at least one refrigeration capacity variation system suitable for driving the contemporary or separate functioning of said compressors (1, 2), with the possibility of controlling the motor rotation of at least one of the compressors in relation to the cooling load to be transferred to the evaporator (6).

15 Claims, 4 Drawing Sheets

CONTROL SYSTEM FOR COMPRESSED GAS REFRIGERATION DRYERS

The present invention relates to a control system for compressed gas refrigeration dryers.

Control systems for compressed gas refrigeration dryers are, for example, described in European patents EP-1089803 and EP-1103296.

A compressed gas refrigeration dryer is a refrigeration machine which is normally used for extracting humidity from a certain flow of compressed air or any other compressed gas; in this respect, even though reference is made hereunder to compressed air, it is evident that all disclosures are equally valid for any other compressed gas.

Humidity present in compressed air is the main cause of corrosion and premature breakage of piping and the malfunctioning or complete uselessness of machines using compressed gas, and it must therefore be eliminated before supplying compressed air to the above equipment.

In the traditional functioning of a compressed air refrigeration dryer, the compressed air which enters the dryer is cooled to condense the humidity (water vapour), which is entrained therewith, subsequently separating and discharging the condensed water vapour; the compressed air leaving the dryer consequently has a much lower dew point than that at the inlet.

All refrigeration compressed gas dryers are generally characterized by a cooling load (a combination of flow-rate, temperature, pressure and relative humidity of the gas) varying from 0 to 100%, and the presence of a suitable control system which adapts the refrigerating capacity produced to the cooling load, at the same time preventing the temperature of the compressed gas from dropping below the value of 0° C., to avoid the formation of ice, and attempting to obtain a constant dew point over a period of time.

In particular, there are currently four different types of compressed gas refrigeration dryers.

The first type of dryer, commonly called "hot gas dryer", normally comprises a refrigerating compressor, which operates uninterruptedly, and a "hot gas" by-pass valve which adapts the refrigerating capacity produced to the cooling load and maintains the temperature of the refrigerant, which evaporates, to values higher than 0° C. The advantages of this system however, relating to the on-variability of the dew point and relatively low costs, contrast with the considerable waste of energy, which is a serious disadvantage, above all nowadays when energy saving is particularly required.

Another type of gas dryer, called "thermal mass dryer", uses an evaporator immersed in a thermal mass (liquid or solid), whose temperature is controlled by a thermostat which activates the compressor when the temperature of the evaporator exceeds a pre-established value; this type of dryer basically functions in the same way as a household refrigerator and maintains the temperature of the thermal mass at values higher than 0° C.

In this case, however, a desirable energy saving is accompanied by difficulties in obtaining a constant dew point and extremely high production costs.

In a further variation of the dryer, the rotation rate of the compressor is controlled by an electronic device (inverter) which adapts the refrigerating capacity produced to the cooling load, maintaining constant temperature and pressure values of the refrigerant, which evaporates at values higher than 0° C.; below a certain rotation rate (within a range of values equal to about 50–80% of the nominal value), this dryer functions in the same way as a dryer of the "hot gas" type.

In this case, a constant dew point is obtained and there is a reasonable energy saving, but still higher than that obtained with a thermal mass dryer.

In the last type of compressed gas dryer ("digital scroll"), the refrigerating capacity produced by a "scroll"-type compressor is adapted to the cooling load by a particular regulating system, which puts the compressor "under vacuum" for a period of time which is proportional to the cooling load to be transferred to the evaporator.

Also in this case a constant dew point is obtained together with a good energy saving, with respect to the dryers previously described, even though the production and operating costs remain quite high.

An objective of the present invention is therefore to indicate a control system for compressed gas refrigeration dryers, which allows the refrigerating capacity or yield, produced by the refrigeration cycle, to be adapted to the cooling load (combination of flow-rate, temperature, pressure and relative humidity of the gas) to be transferred to the evaporator, which can vary from 0 to 100%, and to more or less proportionally reduce the electric power absorbed to obtain values similar to or better than those of thermal mass dryers.

Another objective of the present invention is to create a control system for compressed gas refrigeration dryers, which avoids the formation of ice in the evaporator, maintaining the gas temperatures lower than 0° C., in order to prevent possible breakage of the evaporator and/or obstructions in the gas passage section.

Yet another objective of the present invention is to indicate a control system for compressed gas refrigeration dryers, which allows a substantially constant dew point of the gas leaving the evaporator to be obtained (as close as possible to 0° C.) within wide load variation ranges, at the same time producing a better energy saving with respect to the known solutions.

These and other objectives are achieved by a control system for compressed gas refrigeration dryers according to claim 1, to which reference is made for the sake of brevity.

Further objectives and advantages of the present invention can be clearly understood from the following description and enclosed schematic drawings, provided for purely illustrative and non-limiting purposes, wherein.

Figure 1:
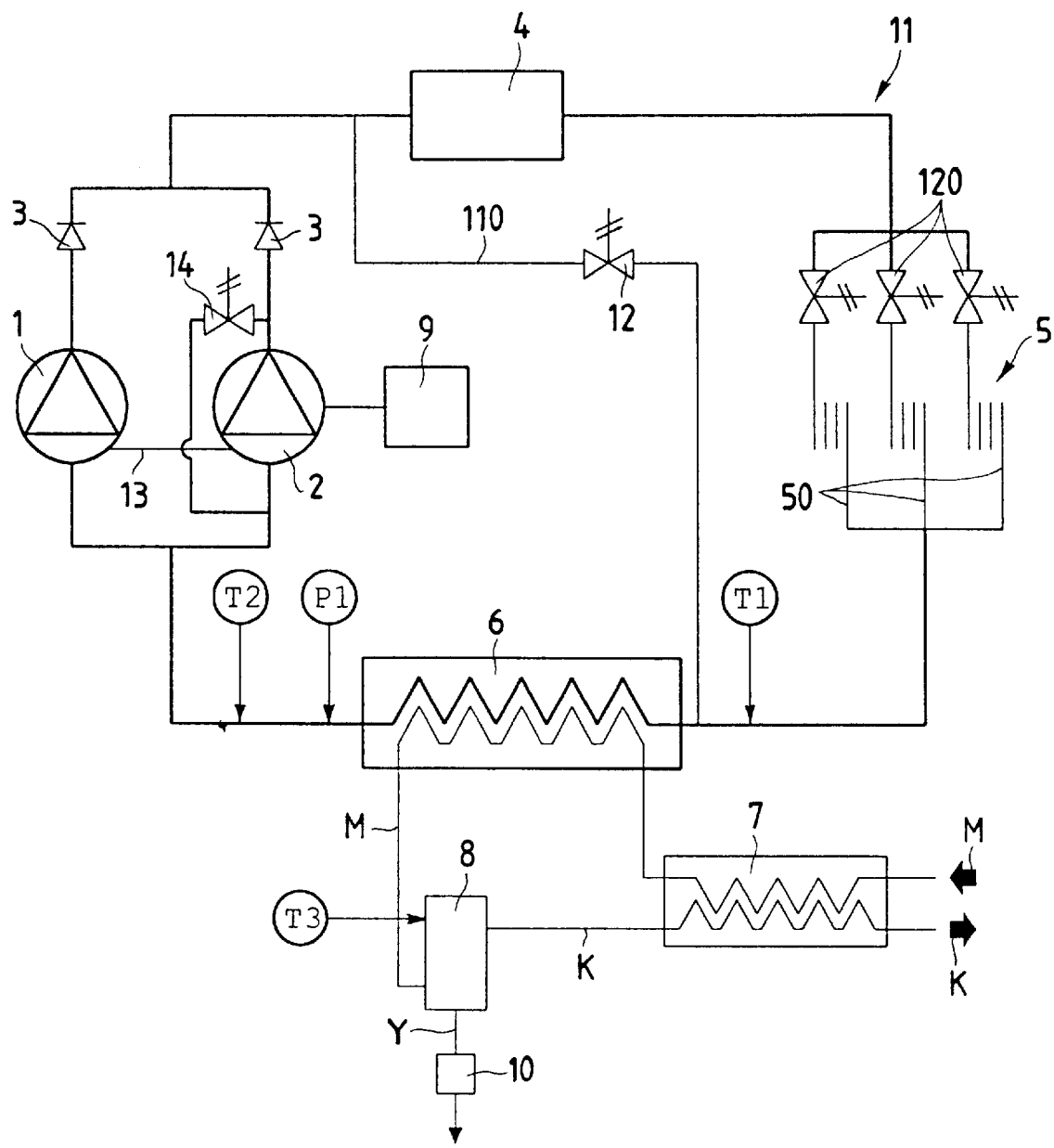
FIG. 1 represents a block scheme of the control system for compressed gas refrigeration dryers with two compressors, according to the present invention.

With particular reference to FIG. 1, a compressed gas refrigeration dryer comprises a gas/gas exchanger indicated by 7 in the figure, an evaporator 6, an air condenser 8 and a refrigeration cycle 11, which, in turn, comprises the above evaporator 6, two compressors 1, 2, a condenser 4 and a lamination unit 5.

The compressed gas to be dried contains water vapour and its relative humidity is normally equal to about 100%; the mixture M (gas+water vapour) first passes through the gas/gas exchanger 7, where it is cooled by the gas leaving the air condenser 8, and then enters the evaporator 6, where it is cooled by the refrigerant, which evaporates until the desired dew point is reached.

The mixture M leaving the evaporator 6 at a temperature T3 carries the condensed water vapour produced during the cooling, which is then separated in the air condenser 8, so that a first portion Y is discharged by means of the discharger 10 to subsequently return to the exchanger 7 and leave the cycle (reference K).

The refrigerant which is evaporated in the evaporator 6, is aspirated, at a pressure P1 and at a temperature T2, and subsequently compressed by compressors 1, 2, connected to each other in parallel and each connected in series to a respective non-return valve 3, whereas the rotation rate of the motor of at least one of the compressors 1, 2 (in the case of the figure, compressor 2) is controlled by an inverter 9.

The compressed gas mixture flows into the condenser 4 and is then expanded by means of the lamination unit 5, to subsequently return to the evaporator 6 at a temperature T1.

The control system of the refrigerating capacity according to the invention, as already mentioned, must allow a constant dew point of the gas mixture close to 0° C. to be obtained, thus avoiding the formation of ice in the evaporator 6.

Alternatively, the dew point can be established in relation to the room temperature value on the basis of a pre-established temperature difference, in order to save further energy when dew point values higher than the minimum value normally provided by the dryer, are acceptable.

Furthermore, the control system, object of the invention, must allow the refrigerating capacity to be adapted to the cooling load to be transferred to the evaporator 6 and, in this respect, it should be noted that the variation in the cooling load to be transferred to the evaporator 6 causes both the temperature T1 and the pressure P1 of the refrigerant in the evaporator 6 to vary, with the same refrigerating capacity produced by the refrigerating cycle.

The conditions described above are satisfactory, according to the present invention, thanks to the use of two compressors 1, 2, connected in parallel in the same refrigerating cycle, which can operate contemporaneously or separately, with the possibility of further controlling the rotation rate of the motor of at least one of the two compressors 1, 2, by means of the inverter 9, in relation to the cooling load to be transferred to the. evaporator 6.

In particular, the respective crankcases (i.e. the zones containing the lubricating oil) of the two compressors 1, 2 are connected with a tube, indicated by 13 in FIG. 1, in order to guarantee complete equalization.

Furthermore, the compressor driven by the inverter 9 is equipped with a vacuum system, comprising an electrovalve 14, which connects the air outlet with aspiration, which is used for balancing the aspiration and outlet pressures before the activation of the compressor to limit the pickup current of the compressor itself and enable the number of starts allowed, to be increased with respect to the traditional solutions.

According to an illustrative and preferred, but non-limiting, embodiment of the present invention, the two compressors 1, 2 have the same displacement, but, in relation to the electric power available, they can have various nominal electric feeds; compressors 1, 2 however can be selected with different displacements even if, when inserted into the same circuit, they must be equalized (and therefore each have a non-return valve at the outlet).

In practice, according to the invention, it is possible to alternately control at least one magnitude between the temperature T1 of the refrigerant which enters the evaporator 6 (thanks to a PID logic or "Fuzzy" logic control algorithm), the surface temperature of the evaporator 6 and the evaporation pressure P1 of the refrigerant (again thanks to the PID logic).

In fact, the control system, object of the present invention, in relation to the measured value of at least one of the three magnitudes mentioned above, reduces the rotation rate of only one of the compressors 1,2 (the one controlled by the inverter 9) or it switches one or both of the compressors 1,2 on and off, in order to keep the temperature of the refrigerant higher than 0° C.

Furthermore, temperature oscillations of the dew point are also avoided, thanks to the presence of a control algorithm which maintains a constant pressure and temperature slightly higher than 0° C. of the refrigerant.

It is also possible to control the outgoing temperature T2 of the refrigerant from the evaporator 6 and, in particular, overheating, defined as the difference between this outgoing temperature T2 and the inlet temperature T1 or the difference between the outgoing temperature T2 and the saturation temperature of the refrigerant corresponding to its evaporation pressure P1, so that, on the basis of overheating, the control system can vary, in certain situations, the rotation rate of the controlled compressor.

More specifically, if the overheating is too high, the system is forced to supply the maximum refrigeration capacity for a limited period of time, as, under certain conditions, the temperature of the refrigerant alone may not be sufficient to guarantee a good dew point.

Finally, to avoid operating at evaporation temperatures lower than 0° C. and consequently, to avoid the formation of ice in particular situations, a small quantity of "hot gas" is injected upstream of the evaporator 6, by means of a capillary tube 110 intercepted by an electrovalve 12; the above unit practically acts as an "antifreeze" and only intervenes for short periods, when the pressure or temperature reaches dangerous values from the point of view of the danger of ice formation and after reducing the work frequency to the minimum value allowed so as not to jeopardize the correct functioning of the compressor.

The antifreeze protection is normally activated by controlling the evaporation pressure and only operates if there are certain variations in the cooling load and only for a few seconds, as, after a certain period of time, the temperature of the refrigerant entering the evaporator 6 also drops to the desired value and the compressor is switched off.

Also from this point of view, the influence of the above antifreeze protection device on the power absorbed by the dryer is therefore limited to certain load ranges and pre-established operating situations and the considerations made with respect to energy saving, compared with the known solutions, mentioned above, consequently continue to be valid; in fact, unlike the scroll compressed gas dryers present on the market, the "by-pass" according to the invention, only transfers a limited percentage of the maximum refrigeration capacity (for example about 5%).

In this way, according to the invention, the dryer functions, within certain cooling load ranges, analogously to a dryer of the "thermal mass" type, by switching at least one of the compressors 1,2 off and on again, when necessary, with the final result that an evident energy saving is obtained, with respect to similar known solutions.

A non-limiting example of a dryer fed at 460 V/three-phase/60 Hz with variations in the load is as follows:

| Load % | Compressor controlled by inverter frequency Hz | Compressor not controlled by inverter frequency Hz | Notes |
|---|---|---|---|
| from 0 to 31 | ON/OFF from 0 to 40 | ON/OFF from 0 to 60 | The compressors rotate allowing a greater number of hourly ON/OFF commands |
| from 31 to 46 | regulated from 40 to 60 | OFF | |
| from 46 to 77 | regulated from 60 to 70 or ON/OFF from 0 to 40 | ON/OFF from 0 to 60 | The compressors rotate allowing a greater number of hourly ON/OFF commands |
| from 77 to 100 | regulated from 40 to 70 | 60 | |

The lamination unit 5 used consists of three capillary tubes 50, each intercepted by an electrovalve 120; when the compressor 2 controlled by the inverter 9, is operating, two of the three capillary tubes 50 are functioning, alternately, in relation to the outgoing frequency, whereas when the compressor 1, not controlled by the inverter 9, is operating, the remaining third capillary tube is also functioning.

Figure 2:
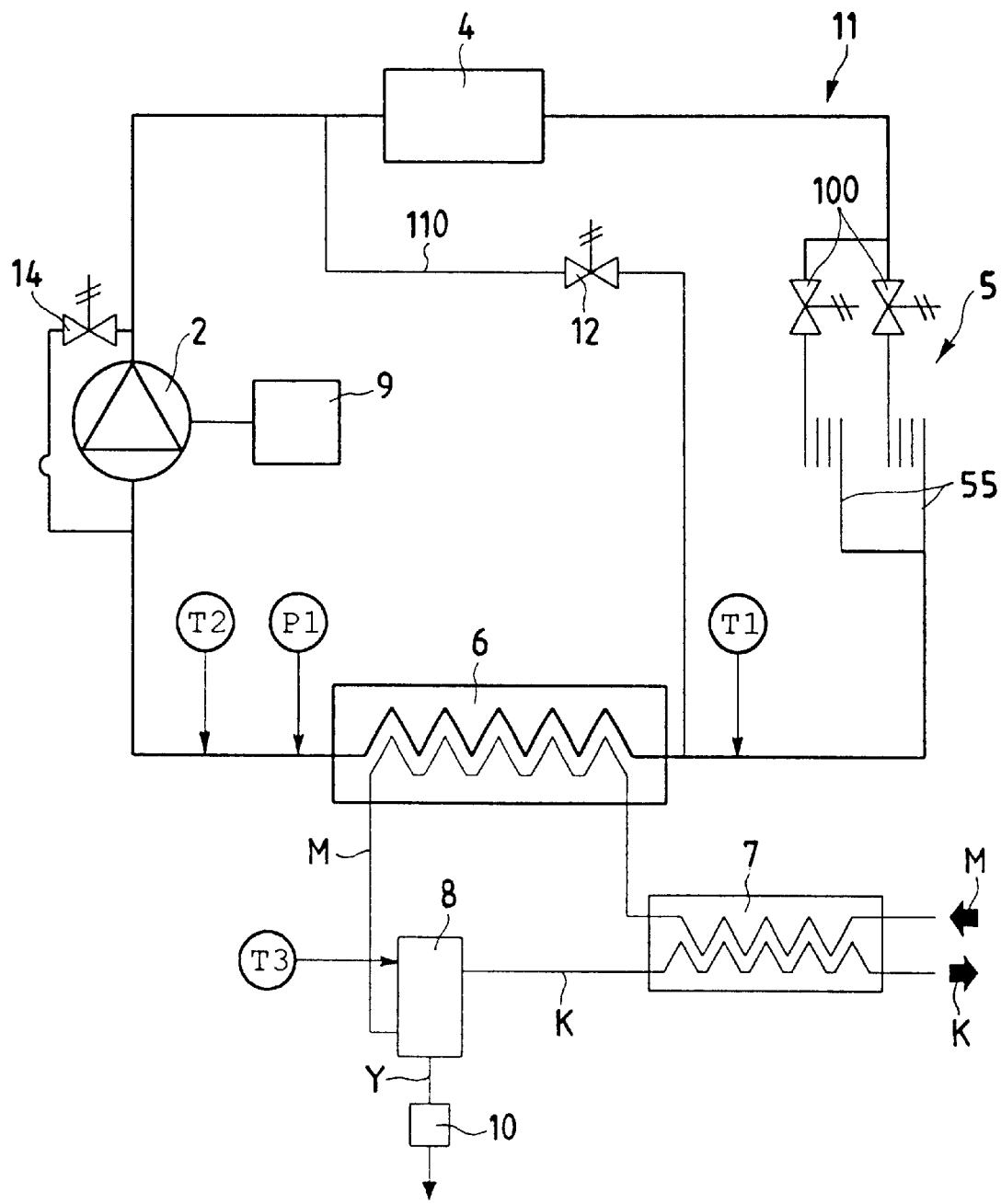
FIG. 2 shows a block scheme of an alternative embodiment of the control system for dryers, according to the invention.

As an alternative to what is described above, the compressed gas dryers may also comprise the use of a refrigeration cycle 11 with a single compressor 2, as can be deduced from FIG. 2, which, with low loads, functions as in thermal mass dryers, passing from standstill to the minimum frequency allowed, whereas, with high loads (higher than the refrigeration yield produced by the compressor when it is operating at the minimum frequency allowed), it operates analogously to scroll dryers i.e. varying its velocity in relation to the load.

As a further alternative to what has been described so far, the compressed gas dryers may also comprise the use of two independent refrigeration cycles 11 with a single evaporator 6 (two sections for the evaporating refrigerant and one for the compressed gas) and at least one compressor for each cycle 11; in this case, the functioning of the control system according to the present invention is such that only one of all of the compressors present is controlled by the inverter 9.

Furthermore, in this case, the lamination unit 5 consists of two capillary tubes 55 each intercepted by an electrovalve 100 and the control system makes either of the capillary tubes operate depending on the outgoing frequency.

The characteristics of the control system for compressed gas refrigeration dryers, which is the object of the present invention, are clearly illustrated by the above description, as are also the advantages.

These in particular are represented by:
- a constant dew point; greater energy saving, with the same performances, with respect to the traditional solutions;
- lower costs, compared with the scroll dryers of the known type, thanks to the use of an inverter having half the capacity.

Finally, numerous variations can obviously be applied to this control system, without excluding any of the novelty principles which characterize the inventive idea illustrated, and it is also evident that, in the embodiment of the invention, the materials, forms and dimensions of the details illustrated can vary according to the demands and can be substituted with other technically equivalent alternatives.

Figure 3:
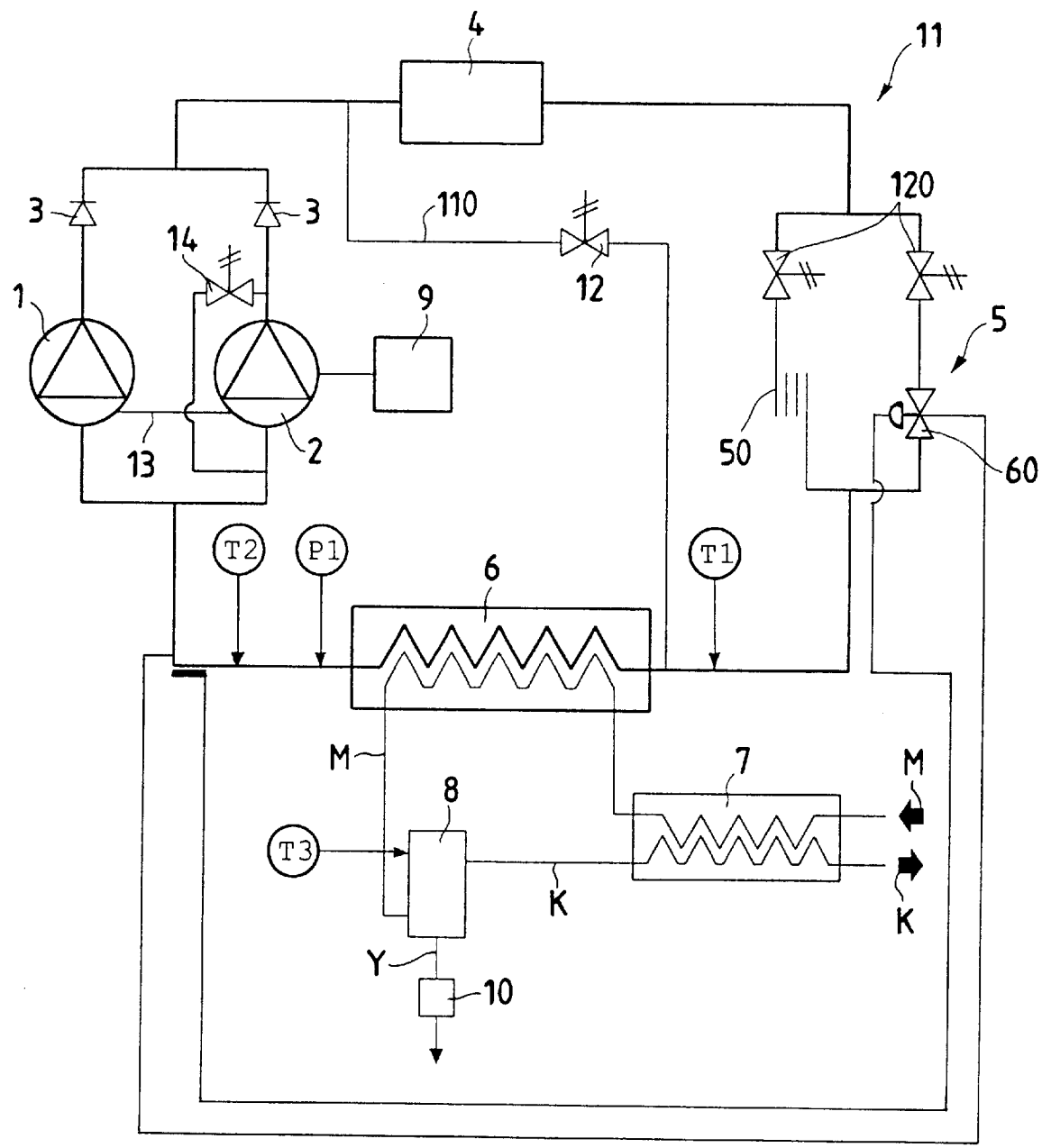
FIGS. 3 and 4 illustrate two additional possible embodiments of the control system according to the invention.

For example, in the embodiment of FIG. 3, the lamination unit 5 used, consists of a capillary tube 50 and a thermostatic valve 60, both intercepted by an electrovalve 120; when the compressor 2 controlled by the inverter 9, is functioning, the electrovalve 60 operates, whereas when the compressor 1, not controlled by the inverter 9, is functioning, the capillary tube 50 operates.

Figure 4:
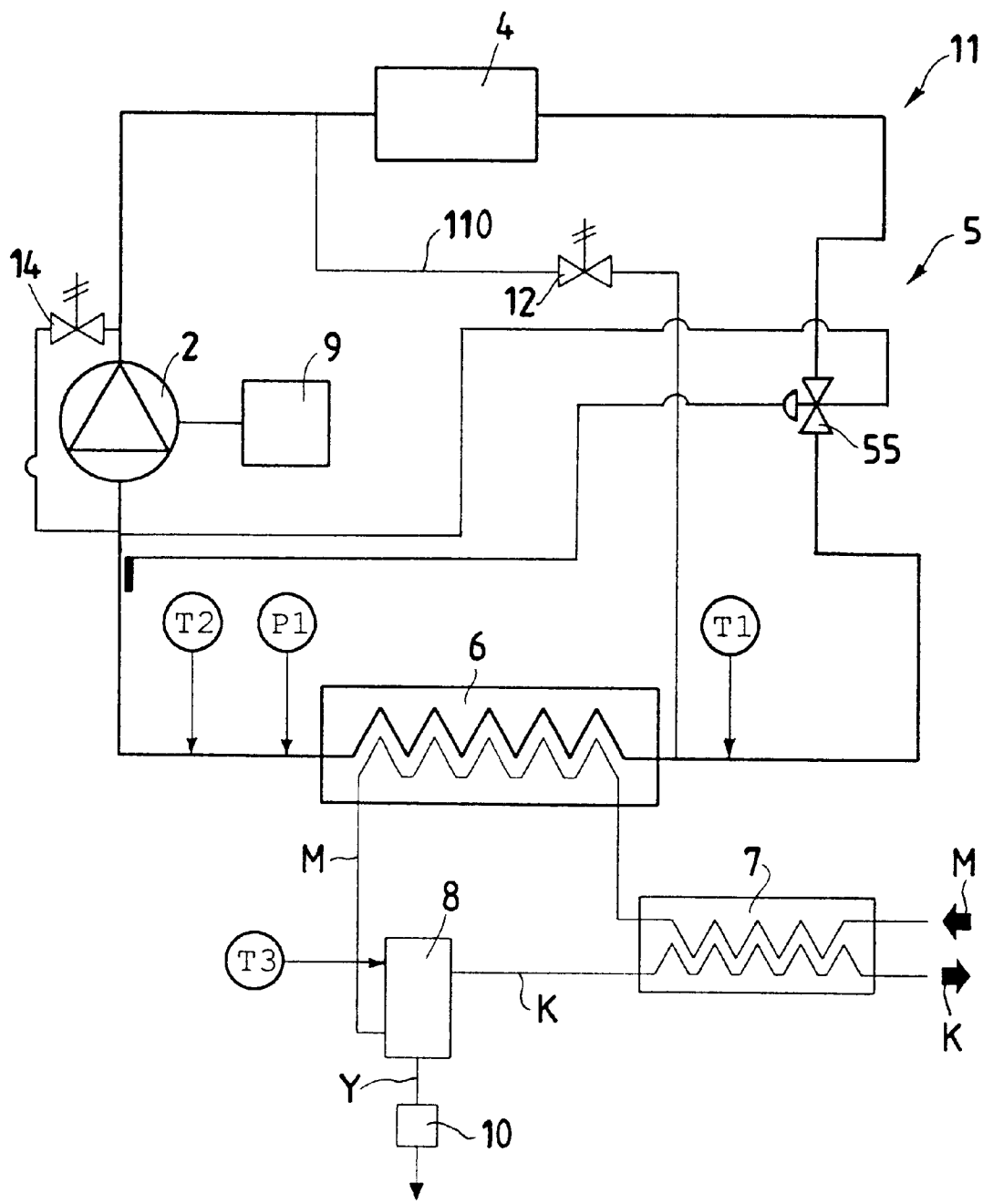

In the embodiment of FIG. 4, on the other hand, the lamination unit 5 simply consists of a thermostatic valve 55.

What is claimed is:

1. A control system for compressed refrigeration dryers, of the type comprising a gas/gas exchanger (7), suitable for cooling a compressed gas mixture (M), using an outgoing gas (K) from an air condenser (8), and at least one refrigeration cycle (11), which includes an evaporator (6), where said mixture of compressed gas (M) is cooled until it reaches the desired dew point by a evaporating refrigerant, at a pre-established pressure (P1) and temperature (T2), at least one compressor (1,2) suitable for aspirating and compressing said refrigerant evaporated in the evaporator (6), a condenser (4), where the compressed gas flows, and at least one lamination unit (5), suitable for expanding said compressed gas and sending it back into the evaporator (6), said gas mixture (M) leaving said evaporator (6) carrying a quantity of condensed water vapour which is separated inside said air condenser (8) and externally discharged by means of a discharger (10), characterized in that each of said refrigeration cycles (11) comprises at least two compressors (1,2), connected in parallel with each other and each connected in series to at least one non-return valve (3), said compressors (1, 2) being further connected, by means of at least one duct (13), so that the respective zones containing lubricating oil are connected with each other, and having at least one refrigeration capacity variation system suitable for driving the contemporaneous or separate functioning of said compressors (1, 2), with the ability to control the rotation of the motor of at least one of the compressors in relation to the thermal load to be transferred to the evaporator (6).

2. The control system according to claim 1, characterized in that said refrigeration capacity variation system comprises an electronic device (9) for controlling the rotation rate of the motor of one (2) of said compressors (1, 2).

3. The control system according to claim 2, characterized in that said compressors (1, 2) can be switched on or off in relation to said cooling load and that the motor of said compressor (2) controlled by the electronic device (9) rotates at frequencies ranging from 0 to a minimum frequency allowed, whereas the motor of said compressor not controlled by the electronic device (9) rotates at frequencies ranging from 0 to a power frequency, the motors of said compressors (1, 2) being capable of rotating with each other, so as to minimize the number of hourly ON/OFF commands of the compressors (1, 2).

4. The control system according to claim 1, characterized in that said compressor (2) controlled by said electronic device (9) has at least one electrovalve (14), which connects the air outlet and aspiration of the compressor (2) at the initiation of each start-up cycle, in order to reduce the pickup current.

5. The control system according to claim 2, characterized in that said electronic device (9) for controlling the rotation rate of the motor of one (2) of said compressors (1, 2) consists of an inverter.

6. The control system according to claim 2, characterized in that it comprises a control of at least one magnitude between the temperature (T1) of said refrigerant which enters said evaporator (6), the surface temperature of said evaporator (6) and the evaporation pressure (P1) of said refrigerant, so that, in relation to at least one of said magnitudes, said system reduces the rotation rate of the compressor (2) controlled by said electronic device (9) or switches at least one of said compressors (1, 2) on and off, in order to maintain the temperature of said refrigerant higher than 0° C., at a certain pressure thereof.

7. The control system according to claim 2, characterized in that it comprises a control of the outgoing temperature (T2) of the refrigerant from said evaporator (6) and of the difference between said outgoing temperature (T2) and the inlet temperature (T1) or of the difference between said outgoing temperature (T2) and the saturation temperature of the refrigerant corresponding to its evaporation pressure (P1).

8. The control system according to claim 1, characterized in that it comprises a control algorithm, having a PID or "Fuzzy" logic of the evaporation pressure (P1) and inlet temperature (T1) of said refrigerant inside said evaporator (6).

9. The control system according to claim 1, characterized in that it comprises at least one limitation unit of the excess refrigeration capacity, consisting of at least one capillary tube (110) intercepted by at least one electrovalve (12), suitable for transferring limited portions of the maximum refrigeration capacity.

10. The control system according to claim 1, characterized in that said lamination unit (5) comprises three capillary tubes (50), each intercepted by an electrovalve (120) so that, when said controlled compressor (2) is functioning, two of the three capillary tubes (50) operate, alternately, in relation to the outlet frequency, whereas, when the non-controlled compressor (1) is functioning, all three capillary tubes operate (50).

11. The control system according to claim 1, characterized in that said lamination unit (5) comprises a capillary tube (50) and a thermostatic valve (60), each intercepted by an electrovalve (120) so that when said controlled compressor (2) is functioning, the electrovalve (60) operates, whereas when said compressor (1), not controlled, is functioning, the capillary tube (50) operates.

12. The control system according to claim 1, wherein each dryer comprises two independent refrigeration cycles (11) with a single evaporator (6) and at least one compressor (2) per cycle, thus forming two sections for the evaporating refrigerant and one for the compressed gas, characterized in that a single compressor (2) among the compressors present inside said refrigeration cycles (11) is controlled by at least one electronic control unit or inverter.

13. The control system according to claim 1 characterized in that it comprises the use of a single refrigeration cycle (11) and a single compressor (2) with the possibility of controlling the rotation of the motor of said compressor in relation to the cooling load to be transferred to the evaporator from a minimum frequency allowed to the power frequency and in that said compressor can be switched on and off in relation to said cooling load passing from standstill to a minimum frequency allowed.

14. The control system according to claim 1, characterized in that said lamination unit (5) comprises two capillary tubes (55) each intercepted by an electrovalve (100), so that said control system causes either one or the other capillary tube to operate, alternately, in relation to the outlet frequency, in order to transfer a limited portion of the maximum refrigeration capacity of said compressor (2) controlled by the inverter.

15. The control system according to claim 1, characterized in that said lamination unit (5) is a thermostatic valve (55).

* * * * *